United States Patent
Holland et al.

(10) Patent No.: US 11,199,716 B2
(45) Date of Patent: Dec. 14, 2021

(54) SYSTEMS, DEVICES, AND METHODS FOR WEARABLE HEADS-UP DISPLAYS

(71) Applicant: GOOGLE LLC, Mountain View, CA (US)

(72) Inventors: Lloyd Frederick Holland, Kitchener (CA); Joshua Moore, Flora (CA); Stephen E. Orzel, Hamilton (CA)

(73) Assignee: Google LLC, Mountain View, CA (US)

( * ) Notice: Subject to any disclaimer, the term of this patent is extended or adjusted under 35 U.S.C. 154(b) by 338 days.

(21) Appl. No.: 16/282,960

(22) Filed: Feb. 22, 2019

(65) Prior Publication Data

US 2019/0265487 A1 Aug. 29, 2019

Related U.S. Application Data

(60) Provisional application No. 62/634,654, filed on Feb. 23, 2018.

(51) Int. Cl.
| | |
|---|---|
| *G02C 1/00* | (2006.01) |
| *G02B 27/01* | (2006.01) |
| *G02C 5/00* | (2006.01) |
| *G02C 5/14* | (2006.01) |
| *G02C 1/08* | (2006.01) |
| *G02C 11/00* | (2006.01) |

(52) U.S. Cl.
CPC ..... *G02B 27/0176* (2013.01); *G02B 27/0172* (2013.01); *G02C 1/08* (2013.01); *G02C 5/001* (2013.01); *G02C 5/146* (2013.01); *G02B 2027/0174* (2013.01); *G02B 2027/0178* (2013.01); *G02C 11/10* (2013.01); *G02C 2200/08* (2013.01)

(58) Field of Classification Search
CPC ... G02C 1/00; G02C 5/00; G02C 1/08; G02C 1/02; G02C 1/04; G02C 1/146; G02C 11/10; G02C 2200/08; G02C 5/14; G02C 5/146; G02C 5/22; G02B 27/14; G02B 27/0176; G02B 27/0172; G02B 2027/0174; G02B 2027/0178
USPC ...... 351/86, 92, 83, 89, 90, 93, 95, 96, 103, 351/106, 111, 158, 41; 359/630, 631, 359/633, 1, 9, 13, 19
See application file for complete search history.

(56) References Cited

U.S. PATENT DOCUMENTS

| | | | |
|---|---|---|---|
| 7,553,013 B2 * | 6/2009 | Tsai | G02C 1/06 351/121 |
| 7,992,996 B2 * | 8/2011 | Sugihara | G02C 9/00 351/158 |

* cited by examiner

*Primary Examiner* — Hung X Dang

(57) ABSTRACT

Systems, devices, and methods for wearable heads-up displays (WHUD) are described. A WHUD includes a front frame with two openings each with one recess which extends along at least a portion of the periphery of the openings, two arms including frame portions and temple portions, two lenses, a projector to generate light, and a holographic optical element (HOE) carried by a lens to redirect light to an eye of a user. Frame portions insert into the recesses and are held in place when the lenses are inserted into the recesses, wherein when the WHUD is assembled the projector and HOE are positioned correctly to create a display for the user. The assembled WHUD is inflexible where the front frame and arms are attached such that when worn the projector maintains a fixed position relative to the HOE and the display remains undistorted and visible to the user.

22 Claims, 6 Drawing Sheets

SYSTEMS, DEVICES, AND METHODS FOR WEARABLE HEADS-UP DISPLAYS

TECHNICAL FIELD

The present systems, devices, and methods generally relate to eyeglasses frames and eyeglasses frames assembly, and particularly relate to systems, devices, and methods that employ such eyeglasses frames in wearable heads-up displays.

BACKGROUND

Description of the Related Art

WEARABLE HEADS-UP DISPLAYS

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. The "combiner" component of a wearable heads-up display is the physical structure where display light and environmental light merge as one within the user's field of view. The combiner of a wearable heads-up display is typically transparent to environmental light but includes some optical routing mechanism to direct display light into the user's field of view.

Examples of wearable heads-up displays include: the Google Glass®, the Optinvent Ora®, the Epson Moverio®, and the Microsoft Hololens® just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date are bulky to enable adequate display performance and, as a result, appear very unnatural on a user's face compared to the more sleek and streamlined look of typical eyeglass and sunglass lenses. However, a traditional eyeglasses frame is problematic when correct alignment of optical components carried by the eyeglasses frame is a necessity for a high quality display. Because traditional eyeglasses have hinges where the arms meet the rest of the frame, any optical components carried on the arms may move relative to the rest of the frame or to the eye of the user while being worn, resulting in loss of or distortion of the display. There is a need in the art for means to successfully integrate display components into smaller frames in order to achieve the inconspicuous form factor and fashion appeal expected of the eyeglass frame industry while still maintaining a high display quality.

BRIEF SUMMARY

An apparatus may be summarized as including: a front eyeglasses frame, including: a first opening; a first recess which extends along at least a portion of a periphery of the first opening; a second opening and a second recess which extends along at least a portion of a periphery of the second opening; a first arm having a first frame portion and a first temple portion, at least one piece of the first frame portion which is dimensioned to be inserted into the first recess of the front eyeglasses frame and the first temple portion which extends rearwardly from the first frame portion with respect to the front eyeglasses frame when the at least one piece of the first frame portion is inserted into the first recess of the front eyeglasses frame; a second arm having a second frame portion and a second temple portion, at least one piece of the second frame portion which is dimensioned to be inserted into the second recess of the front eyeglasses frame and the second temple portion which extends rearwardly from the first frame portion with respect to the front eyeglasses frame when the at least one piece of the second frame portion is inserted into the second recess of the front eyeglasses frame; and a first lens dimensioned to be inserted into the first recess and which holds the first arm in place in the front eyeglasses frame when the first lens is inserted into the first recess; a second lens dimensioned to be inserted into the second recess, wherein the second arm is held in place when the second lens is inserted into the second recess.

At least an anterior part of the first temple portion may be in a fixed position relative to the front frame and the first lens when the first arm and first lens are inserted into the front frame. The first arm and the second arm both may have a hinge which allows for a posterior part of the respective temple portion to be folded in towards the front frame while an anterior part of the respective temple portion maintains a fixed position relative to the front frame. The first arm may carry at least one light source and the at least one light source may be positioned to direct light from the at least one light source toward an eye of the user when the eyeglasses are worn by the user.

The apparatus may further include a power source which is carried by the first arm and is electrically coupled to the at least one light source.

The apparatus may further include a power source which is carried by the second arm and is electrically coupled to the at least one light source.

The first temple portion may be at least partly hollow and the first arm may have an aperture into the first temple portion which is covered by the front frame when the first arm is inserted into the first recess of the front frame.

The apparatus may further include at least one light source carried within the first arm, wherein light from the at least one light source may be directed toward an eye of the user.

The apparatus may further include at least one power source carried within the first temple portion, the at least one power source electrically coupled to the at least one light source The second temple portion may be at least partly hollow and the second arm may have an aperture into the second temple portion which is covered by the front frame when the second arm is inserted into the second recess of the front frame, and wherein the eyeglasses may further include at least one power source carried within the second temple portion, the at least one power source electrically coupled to the at least one light source.

A wearable heads-up display (WHUD) may be summarized as including: a support structure including: a front eyeglasses frame, including: a first opening; a first recess which extends along at least a portion of a periphery of the first opening; a second opening and a second recess which extends along at least a portion of a periphery of the second opening; a first arm having a first frame portion and a first temple portion, at least one piece of the first frame portion which is dimensioned to be inserted into the first recess of the front eyeglasses frame and the first temple portion which extends rearwardly from the first frame portion with respect to the front eyeglasses frame when the at least one piece of the first frame portion is inserted into the first recess of the front eyeglasses frame; a second arm having a second frame portion and a second temple portion, at least one piece of the second frame portion which is dimensioned to be inserted into the second recess of the front eyeglasses frame and the second temple portion which extends rearwardly from the first frame portion with respect to the front eyeglasses frame when the at least one piece of the second frame portion is inserted into the second recess of the front eyeglasses frame; and a first lens dimensioned to be inserted into the first recess and which holds the first arm in place in the front eyeglasses frame when the first lens is inserted into the first recess, wherein at least an anterior part of the first arm is in a fixed position relative to the front frame and the first lens when the first lens is inserted; a second lens dimensioned to be inserted into the second recess, wherein the second arm is held in place when the second lens is inserted into the second recess, wherein at least an anterior part of the second arm is in a fixed position relative to the front frame and the second lens when the second lens is inserted; a projector carried by the anterior part of the first arm; and a holographic optical element (HOE) carried by the first lens and positioned to receive light from the projector and to direct the received light towards the eye of the user when the wearable heads-up display is worn by the user, wherein when the first arm and first lens are inserted into the front frame the projector is in a fixed position relative to the HOE.

The WHUD may further include a power source which is carried by the first arm and electrically coupled to the projector.

The WHUD may further include a power source which is carried by the second arm and electrically coupled to the projector.

At least one of the first temple portion and the second temple portion may be at least partly hollow. The first temple portion may be at least partly hollow and the first arm may have an aperture into the first temple portion which is covered by the front frame when the first arm is inserted into the front frame. The second temple portion may be at least partly hollow and the second arm may have an aperture into the second temple portion which is covered by the front frame when the second arm is inserted into the front frame. The first temple portion may be at least partly hollow and the projector may be at least partly carried within the first arm. The first temple portion may be at least partly hollow, and the WHUD may further include a power source which is electrically coupled to the projector and is at least partly carried within the first arm. The second temple portion may be at least partly hollow, and the WHUD may further include a power source which is electrically coupled to the projector and is at least partly carried within the second arm. The first arm and the second arm may both have a respective hinge which allows for a posterior part of the respective temple portion to be folded towards the front frame while an anterior part of the respective temple maintains a fixed position relative to the front frame.

A method of assembling eyeglasses that comprise a front eyeglasses frame having a first opening with a first recess which extends along at least a portion of a periphery of the first opening of the front eyeglasses frame, and having a second opening with a second recess which extends along at least a portion of a periphery of a second opening of the front eyeglasses frame, a first arm having a first temple portion and a first frame portion, a second arm having a second temple portion and a second frame portion, a first lens, and a second lens, may be summarized as including: inserting the first frame portion of the first arm into the first recess of the front eyeglasses frame; inserting the first lens into the first recess of the front eyeglasses frame to secure the first arm in place via the insertion of the first lens in the first recess of the front eyeglasses frame; inserting the second frame portion of the second arm into the second recess of the front eyeglasses frame; and inserting the second lens into the second recess of the front eyeglasses frame to secure the second arm in place via the insertion of the second lens in the second recess of the front eyeglasses frame.

A method of assembling a wearable heads-up display (WHUD) that comprises: a front eyeglasses frame having a first opening with a first recess which extends along at least a portion of a periphery of the first opening of the front eyeglasses frame, and a second opening with a second recess which extends along at least a portion of a periphery of the second opening of the front eyeglasses frame, a first arm having a first temple portion and a first frame portion, a second arm having a second temple portion and a second frame portion, a first lens, and a second lens, and a projector carried by the first arm, and a holographic optical element (HOE) carried by the first lens, may be summarized as including: inserting the first frame portion of the first arm into the first recess of the front eyeglasses frame; inserting the first lens into the first recess of the first opening of the front eyeglasses frame to hold the first arm in place such that the projector maintains a fixed position relative to the HOE when the first lens is inserted; inserting the second arm into the second recess of the front eyeglasses frame; and inserting the second lens into the second recess of the second opening of the front eyeglasses frame to hold the second arm is held in place when the second lens is inserted.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling mediated by one or more additional objects. Thus the term carries and variants such as "carried by" are meant to generally encompass all manner of direct and indirect physical coupling.

Throughout this specification and the appended claims, the term "projector" is meant to encompass all components (except a power source) which are required to generate and output light on a desired path. Such components may include but are not limited to: laser diodes, LCD or other microdisplays, beamsplitters, dichroic mirrors, and controllable mirrors such as MEMs mirrors.

Throughout this specification and the appended claims, the term "holographic optical element" or "HOE" is meant to refer to any optical element which includes at least one hologram including but not limited to: a reflective hologram, a transmissive hologram, and/or a volume hologram.

The headings and Abstract of the Disclosure provided herein are for convenience only and do not interpret the scope or meaning of the embodiments.

Figure 1:
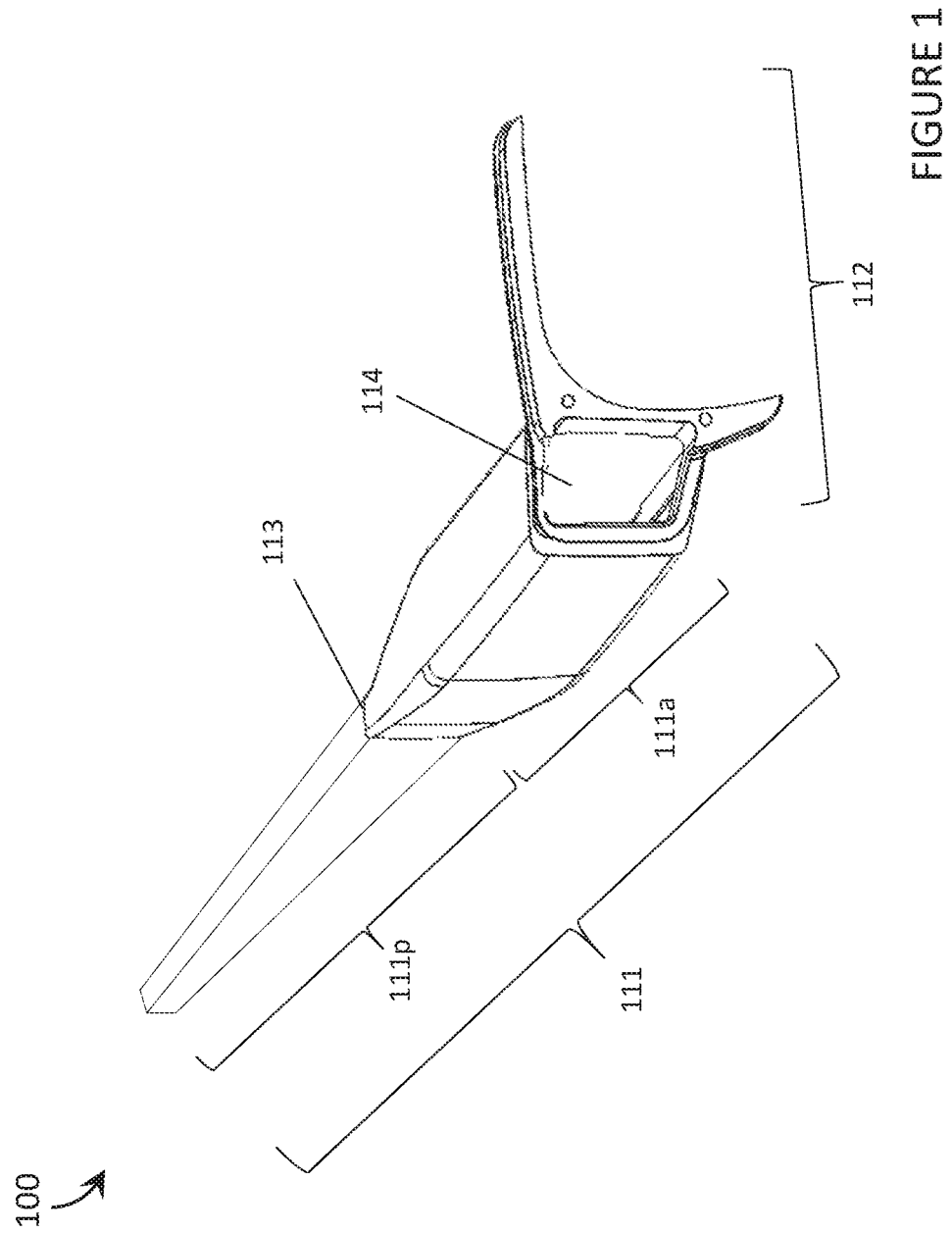
FIG. 1 is an isometric view of a temple arm of an eyeglasses frame in accordance with the present systems, devices, and methods.

FIG. 1 is an isometric view of an arm 100 of an eyeglasses frame in accordance with the present systems, devices, and methods. Arm 100 includes a temple portion 111 and a frame portion 112. Temple portion 111 is hollow and has an aperture 114 at the front. This allows for components of a wearable-heads-up display to be inserted through aperture 114 and placed within arm 100. Frame portion 112 is stiff and inflexible. The inflexibility of frame portion 112 is such that when frame portion 112 is inserted into a front eyeglasses frame of a pair of eyeglasses and held in place by a lens (as discussed further below) arm 100 maintains a fixed position relative to the front eyeglasses frame. There is no hinge connecting the arm of the eyeglasses to the front eyeglasses frame of the eyeglasses, in contrast to traditional eyeglasses, however, temple portion 111 has a hinge 113 which separates temple portion 111 into an anterior part 111a and a posterior part 111p, wherein posterior part 111p folds in towards the front eyeglasses frame. Temple portion 111 and frame portion 112 may be a single component or may be two components which are combined to make arm 100. In FIG. 1, frame portion 112 is attached to temple portion 111 with screws but could be attached by other fasteners (e.g., bolts, rivets, adhesive, epoxy).

Figure 2:
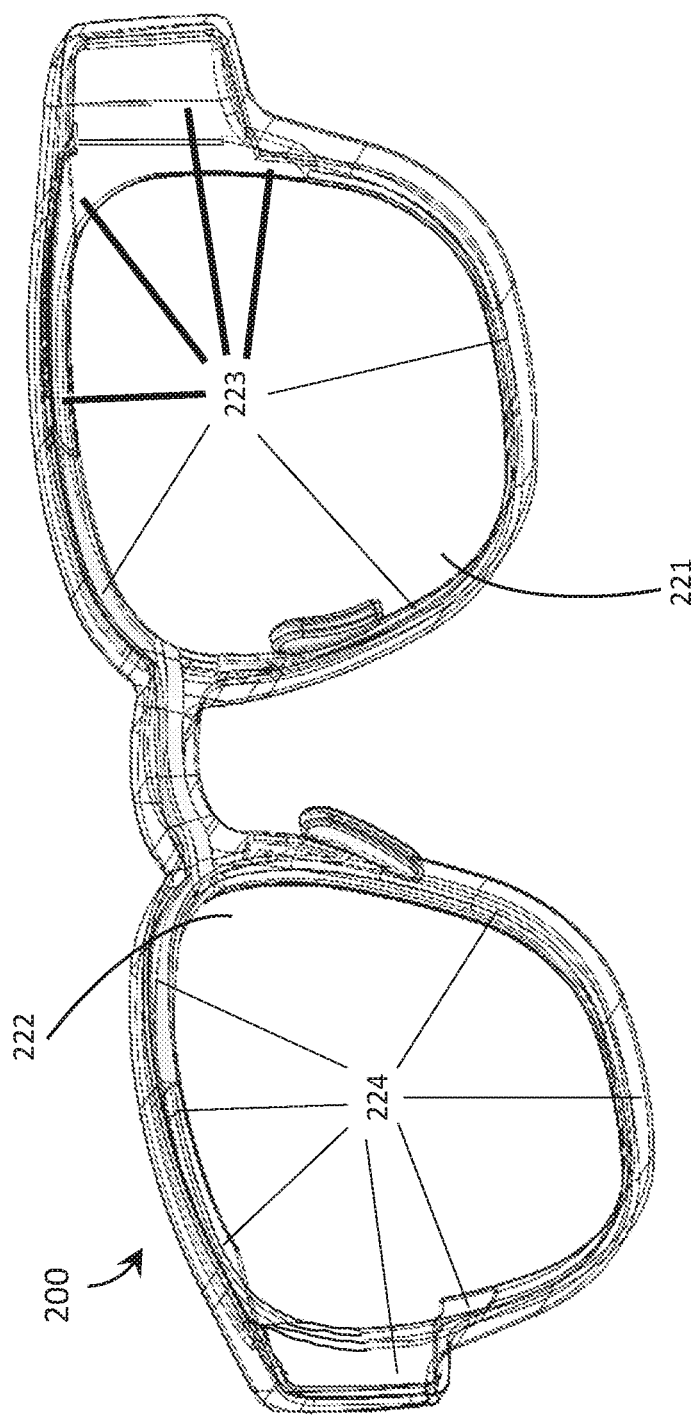
FIG. 2 is an isometric view of a front eyeglasses frame in accordance with the present systems, devices, and methods.

FIG. 2 is an isometric view of an front eyeglasses frame 200 in accordance with the present systems, devices, and methods. Front eyeglasses frame 200 comprises front eyeglasses frame 220 including a first opening 221, a second opening 222, a first recess 223 which extends along at least a portion of a periphery of first opening 221, and a second recess 224 which extends along at least a portion of a periphery of second opening 222. Front eyeglasses frame 200 has the shape and appearance of the part of a traditional pair of eyeglasses which is worn on the front of the face of a user. Recesses 223 and 224 are sized and dimensioned to receive frame portions of arms (as shown in FIG. 1) and lenses to form a complete pair of eyeglasses. Frame portion 112 of FIG. 1 inserts into recess 223, specifically the upper right portion of the recess which is called out by thicker label lines. A complete pair of eyeglasses with the arms and lenses are inserted into the front eyeglasses frame is shown in FIG. 3 and discussed below.

Figure 3:
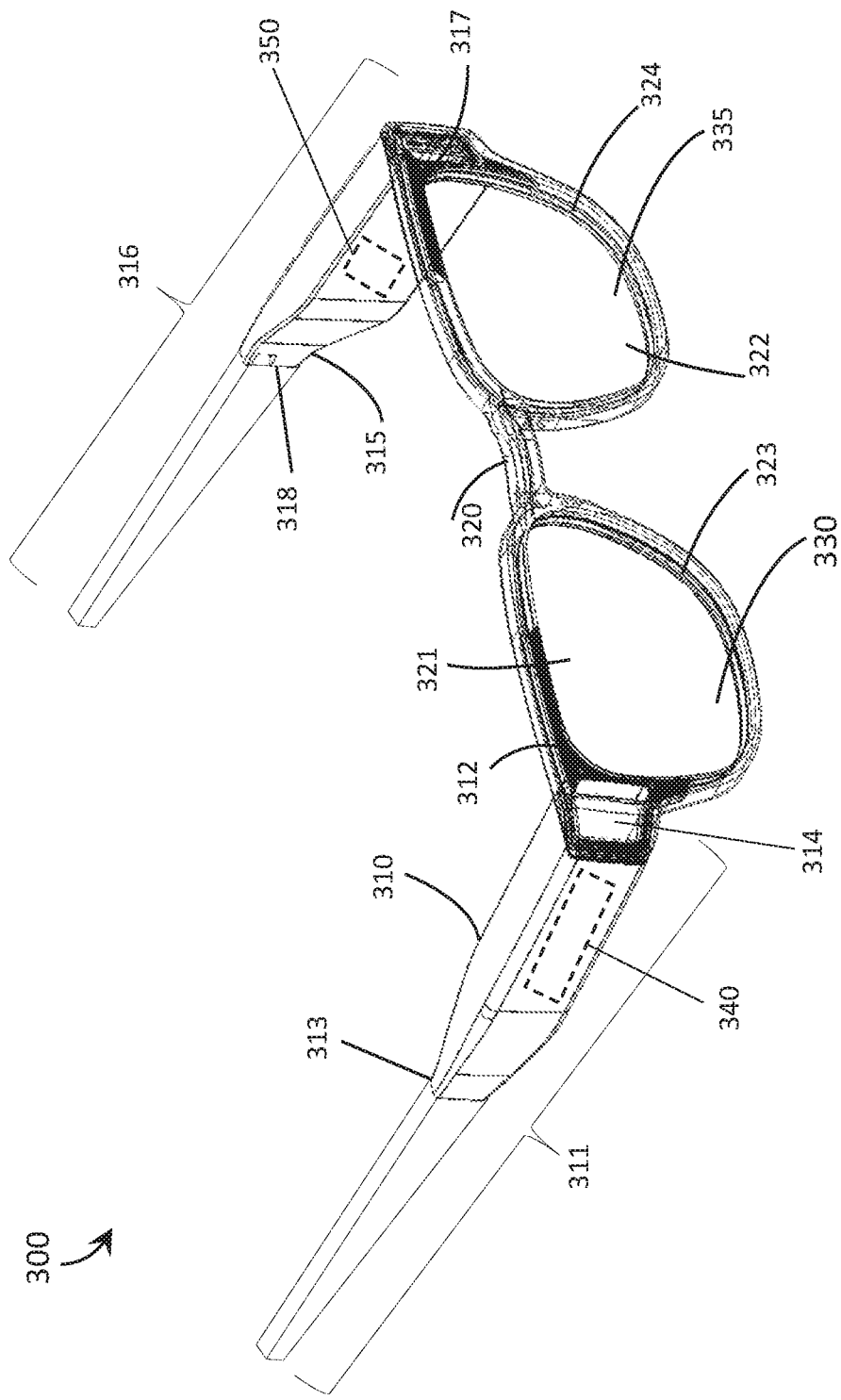
FIG. 3 is an isometric view of eyeglasses in accordance with the present systems, devices, and methods.

FIG. 3 is an isometric view of a pair of eyeglasses 300 in accordance with the present systems, devices, and methods. Eyeglasses 300 include a first arm 310, a second arm 315, a front eyeglasses frame 320, a first lens 330, and a second lens 335. First arm 310 includes a first temple portion 311 and a first frame portion 312 and second arm 315 includes a second temple portion 316 and a second frame portion 317. Temple portions 311 and 316 each sit on a respective ear of a user to hold eyeglasses 300 on a head of the user. First arm 310 includes a hinge 313 and second arm 315 includes a hinge 318 as in FIG. 1. Hinges 313 and 318 separate the respective temple portions into anterior and posterior parts (not labelled to reduce drawing clutter, but the same as in FIG. 1), wherein the posterior parts fold in towards the front eyeglasses frame. In other implementations the arms may have no hinges. Front eyeglasses frame 320 has the shape and appearance of the front of a traditional pair of eyeglasses. Front eyeglasses frame 320 has a first opening 321 and a second opening 322. A first recess 323 in the front eyeglasses frame 320 extends along at least a portion of a periphery of the first opening 321. First frame portion 312 and first lens 330 are inserted or received by the first recess 323. A second recess 324 in the front eyeglasses frame 320 extends along at least a portion of a periphery of the second opening 322. The second frame portion 317 and second lens 335 are inserted or received by the second recess 324. Front eyeglasses frame 320 is drawn as transparent and first frame portion 312 and second frame portion 317 drawn black to enable better visibility of how and where frame portions 312 and 317 insert into respective recesses 323 and 324. Lenses 330 and 335 may be inserted and held in respective recesses 323 and 324 by an interference fit or press fit or by a heat/shrink fit. Each of recesses 323 and 324 is of a size and shape that can receive the respective frame portion and the respective lens and hold both components in place without any movement once both components are inserted. The size and shape of frame portions 312 and 317 is complimentary in at least one axis to the respective top outer "corner" (i.e., the superior lateral corner) of front eyeglasses frame 320. In other implementations, the size and shape of first recess 323 and second recess 324 may differ and the size and shape of frame portions 312 and 317 may be complementary only to the size and shape of the respective recess into which the frame portion is inserted. Eyeglasses 300 may be a wearable heads-up display wherein display-producing components are present within or carried by one or both arms (i.e., one arm for a monocular display, both arms for a binocular display) and display components are embedded within or carried by one or both lenses. In FIG. 3, a light source 340 is carried within first arm 310 and a power source 350 is carried within second arm 316. As in FIG. 1, the temple portions of eyeglasses 300 are hollow to enable carrying of light source 340 and power source 350. First temple portion 311 has an aperture 314 through which light source 340 was inserted and which is covered by front eyeglasses frame 320 when first arm 310 is inserted into front eyeglasses frame 320. Second temple portion 316 also has an aperture (not seen due to angle) through which power source 350 was inserted and which is covered by front eyeglasses frame 320 when second arm 315 is inserted into front eyeglasses frame 320. The use of front eyeglasses frame 320 to close aperture 314 and the aperture on second temple portion 316 allows for a seamless design of first arm 310 and second arm 315, which does not require fasteners, such as adhesives or screws. Additionally, front eyeglasses frame 320 is held firmly in place on aperture 314 and the aperture on second temple portion 316 when front eyeglasses frame portions 312 and 317 and lenses 330 and 335 are inserted. This eliminates any light leakage (exclusive of any designed outputs of light for the light source), heat leakage, or power source safety issues that may occur if an arm contained seams. The display-producing components may be a projector, such as a scanning laser projector with laser diodes, or may be a micro-display, such as a LCD or OLED array. The display components embedded in the lenses may be a waveguide which receives light from the display-producing components and guides the light towards an eye of the user, or may be a reflector, refractor, or diffractor, for example a holographic optical element as shown in FIG. 4 and discussed below.

The resulting fixed position of at least the anterior portions of the arms relative to the front eyeglasses frame may enable correct initial and "in-use" positioning of components other than a projector and a HOE, for example, the electrical components which may connect a power source to the projector.

Figure 4:
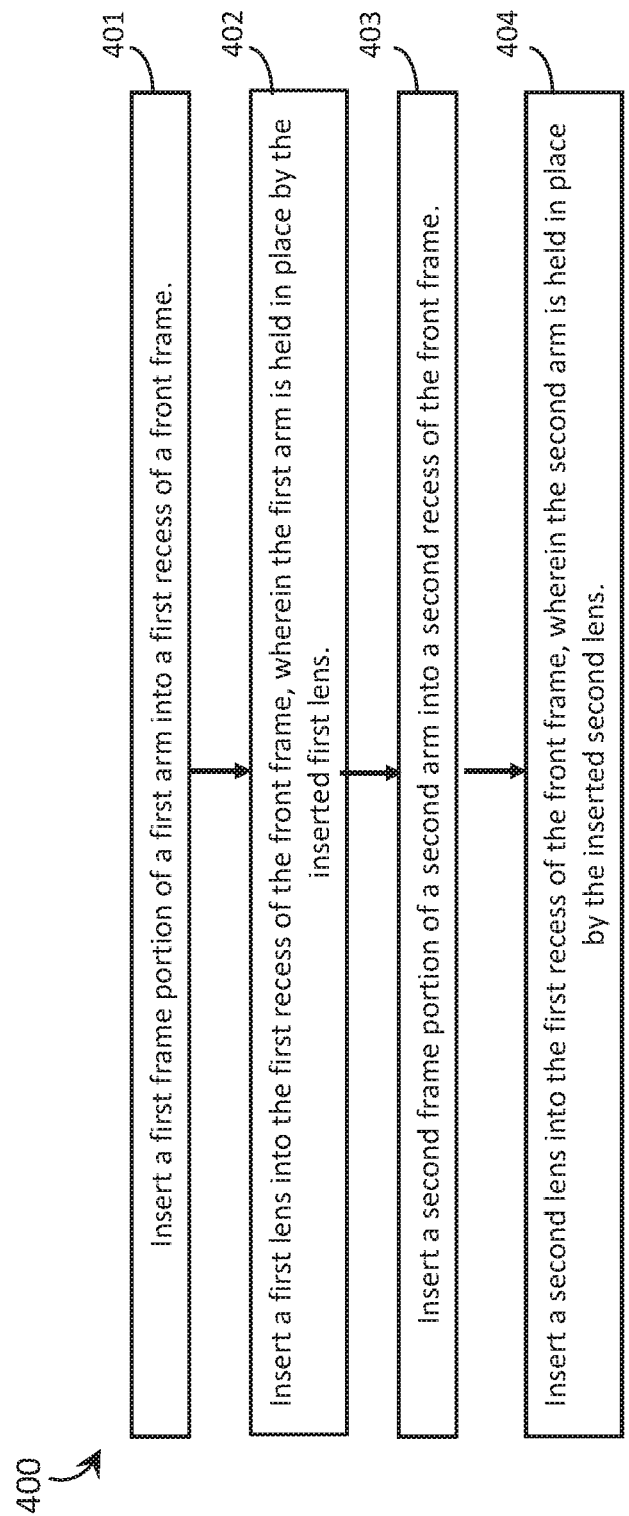
FIG. 4 is a flow diagram of a method of assembling eyeglasses in accordance with the present systems, devices, and methods.

FIG. 4 is a flow diagram of a method 400 of assembling a pair of eyeglasses. The eyeglasses of FIG. 4 may be substantially similar to eyeglasses 300 of FIG. 3 and generally include a front eyeglasses frame, a first arm including a first temple portion and a first frame portion, a second arm including a second temple portion and a second frame portion, a first lens, and a second lens. The front eyeglasses frame includes a first opening and a second opening. A first recess in the front eyeglasses frame extends along at least a portion of a periphery of the first opening. A second recess in the front eyeglasses frame extends along at least a portion of a periphery of the second opening. Method 400 includes acts 401, 402, 403, and 404, thought those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 401, the first frame portion of the first arm is inserted into the first recess of the front eyeglasses frame. The first frame portion and the first recess of the front eyeglasses frame must be shaped such that the first frame portion can be inserted snugly into the first recess to prevent movement of the first arm relative to the front eyeglasses frame once the eyeglasses are fully assembled. The overall shape of the first arm, including the first temple portion and the first frame portion must be such that when the first frame portion is inserted into the front eyeglasses frame the first temple portion is approximately orthogonal to the front eyeglasses frame. That is, the first temple portion must be at an angle relative to the front eyeglasses frame that allows for the first arm to be worn over a first ear of a user while the front eyeglasses frame is positioned correctly on the face of the user.

At 402, the first lens is inserted into the first recess of the front eyeglasses frame. The shape of the first frame portion and the front eyeglasses frame must allow for the first lens to be inserted into the first recess after the first frame portion has been inserted. That is, the first recess must be shaped to receive both the first frame portion and the first lens correctly. The first frame portion may be smooth and abut the first lens or the first frame portion may include a third recess aligned with the first recess into which the first lens is inserted when also inserted into the first recess. The insertion of the first lens may employ an interference fit or a heat fitting the first lens into the first recess. The insertion of the first lens may also include other means to hold the first lens in place, such as adhesives or screws.

At 403, the second frame portion is inserted into the second recess of the front eyeglasses frame. As with the first arm, the second frame portion and the second recess of the front eyeglasses frame must be shaped such that the second frame portion can be inserted snugly into the first recess to prevent movement of the second arm relative to the front eyeglasses frame once the eyeglasses are fully assembled. The overall shape of the second arm, including the second temple portion and the second frame portion must be such that when the second frame portion is inserted into the front eyeglasses frame the second temple portion is approximately orthogonal to the front eyeglasses frame. That is, the second temple portion must be at an angle relative to the front eyeglasses frame that allows for the second arm to be worn over a second ear of the user while the front eyeglasses frame is positioned correctly on the face of the user.

At 404, the second lens is inserted into the second recess of the front eyeglasses frame. The shape of the second frame portion and the front eyeglasses frame must allow for the second lens to be inserted into the second recess after the second frame portion has been inserted. That is, the second recess must be shaped to receive both the second frame portion and the second lens correctly. The second frame portion may be smooth and abut the second lens or the second frame portion may include a fourth recess aligned with the second recess into which the second lens is inserted when also inserted into the second recess. The insertion of the second lens may employ interference fit or a heat fitting the second lens into the second recess. The insertion of the second lens may also include other means to hold the second lens in place, such as adhesives or screws.

Figure 5:
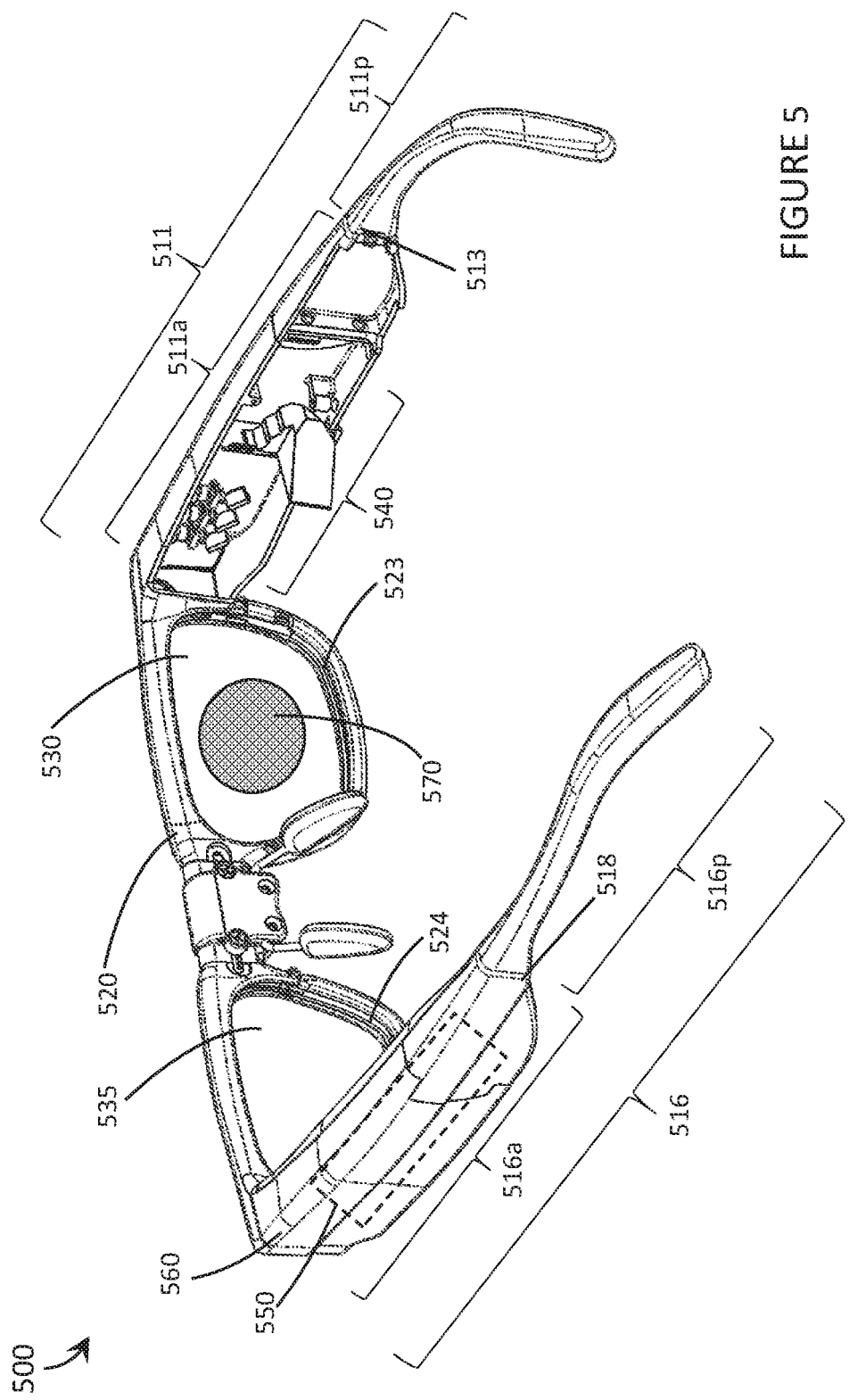
FIG. 5 is an isometric view of a wearable heads-up display in accordance with the present systems, devices, and methods.

FIG. 5 is an isometric view of a wearable heads-up display (WHUD) 500 in accordance with the present systems, devices, and methods. WHUD 500 comprises a support structure 560 including a front eyeglasses frame 520 having a first recess 523 which extends along at least a portion of a periphery of a first opening (not called out to reduce clutter) and a second recess 524 which extends along at least a portion of a periphery of a second opening (not called out to reduce clutter), a first arm including a first temple portion 511 and a first frame portion (hidden from view within first recess 523 of front eyeglasses frame 520, but generally similar to frame portion 112 of FIG. 1, and first frame portion 312 of FIG. 3, but generally similar to second frame portion 317 of FIG. 3), and a second arm including a second temple portion 516 and a second frame portion (hidden from view within second recess 524 of front eyeglasses frame 520), a first lens 530 carried by front eyeglasses frame 520, a second lens 535 carried by front eyeglasses frame 520, a projector 540 carried by support structure 560, a holographic optical element 570 carried by first lens 530, and a power source 550 carried by support structure 560. First temple portion 511 is divided into an anterior part 511a (closer to front eyeglasses frame 520 and therefore closer to the front of the user when WHUD 500 is worn) and a posterior part 511p (further from front eyeglasses frame 520 and therefore closer to the back of the user when WHUD 500 is worn) by a hinge 513. Posterior part 511p of first temple portion 511 can be folded medially in towards front eyeglasses frame 520, while anterior part 511a of first temple portion 511 does not move relative to front eyeglasses frame 520. Second temple portion 516 is divided into an anterior part 516a (closer to front eyeglasses frame 520 and therefore closer to the front of the user when WHUD 500 is worn) and a posterior part 516p (further from front eyeglasses frame 520 and therefore closer to the back of the user when WHUD 500 is worn) by a hinge 518. Posterior part 516p of second temple portion 516 can be folded medially in towards front eyeglasses frame 520, while anterior 516a part of first temple portion 516 does not move relative to front eyeglasses frame 520. First temple portion 511 and second temple portion 512 may be at least partly hollow. For example, the respective posterior parts of each temple portion may be hollow. In FIG. 5, posterior parts 511p and 516p are hollow and components of projector 540 are carried within posterior part 511p and a power source 570 is carried within posterior part 516p. In this configuration, components (e.g. electrical wires) which couple power source 550 to projector 540 may need to be embedded within front eyeglasses frame 520. In other implementations, the power source may be carried on the same arm as the projector and no coupling components may be within front eyeglasses frame 520. HOE 570 may be carried on or within first lens 530.

During assembly of WHUD 500 the first frame portion of the first arm is inserted into first recess 523 of front eyeglasses frame 520 and the second frame portion of the second arm is inserted into second recess 524 of front eyeglasses frame 520 and then first lens 530 is inserted into first recess 523 and second lens 535 is inserted into second recess 524. Both the first frame portion and the second frame portion are inflexible and fit into the respective recesses such that when the respective lens is inserted and is in contact with the respective frame portion neither the first frame portion nor the second frame portion moves significantly relative to the front eyeglasses frame or the respective lens. The first frame portion is also connected to anterior part 511a in such a way that anterior part 511a does not move relative to the first frame portion. Therefore, when WHUD 500 is assembled, the first lens does not move relative to the components which are carried by anterior part 511a of first temple portion 511. Most importantly, projector 540 does not move relative to HOE 570. This ensures correct alignment of projector 540 and HOE 570 during assembly and continued correct alignment of projector 540 and HOE 570 during use of WHUD 500 by the user, wherein correct alignment of projector 540 and HOE 570 means that light output by projector 540 is incident on HOE 570 such that the light is redirected to an eye of the user. Any movement of projector 540 (specifically the output of the projector) relative to HOE 570 may result in images which are distorted or not visible to the user at all. If either the first arm or the second arm of WHUD 500 are hollow any components carried within the respective arm may be inserted into the arm through an opening at the "front eyeglasses frame end" of the arm which is covered by the front eyeglasses frame when the arm is inserted into the respective recess of the front eyeglasses frame. In such an implementation, the arm can be seamless which allows for both easier manufacturing/assembly and, in the case of an arm with a projector within, no loss of light through seams or holes.

WHUD 500 operates as follows. Power source 550 provides power to projector 530 via electrical coupling. Projector 540 generates light which is directed towards HOE 570. In FIG. 5, projector 540 includes laser diodes which generate light and mirrors which direct the light towards HOE 570. In other implementations, other light sources, such as LCD microdisplays, may be used and other means of directing the light towards HOE 570, such as a waveguide, may be used. HOE 570 redirects the light towards an eye of the user. If the support structure of WHUD 500 had a traditional eyeglasses frame, where the first arm is connected to front eyeglasses frame 520 by a hinge, then any movement of the first arm that may naturally occur while the user is wearing WHUD 500 could misalign projector 540 and HOE 570 such that the light is distorted or not visible to the user. By making the connections between front eyeglasses frame 520 and the first arm and first lens 530 and the first arm inflexible, correct alignment of projector 554 and HOE 570 is always maintained. Projector 540 may be communicatively coupled to a processor (e.g., microprocessor, field programmable gate array, application specific integrated circuit, programmable logic controller) which modulates the output of light from projector 550. The processor may be communicatively coupled to a non-transitory processor-readable storage medium (e.g., volatile memory such as Random Access Memory (RAM), memory caches, processor registers; nonvolatile memory such as Read Only Memory, EEPROM, Flash memory, magnetic disks, optical disks) and the processor may execute data and/or instruction from the non-transitory processor readable storage medium to modulate projector 540. WHUD 500 has a right-side monocular display but in other implementations the WHUD may have a left-side monocular display or a binocular display.

In FIG. 5, projector 540 and power source 550 are carried within the arms. In other implementations, various components of a projector or a power source may be carried on an arm while other components are carried within that same arm or all component may be carried on an arm. When a projector and a power source are carried on/in different arms, the projector and the power source may be electrically coupled by elements which are carried within or on the front eyeglasses frame. FIG. 5 has a monocular display with only one projector, but other implementations may have a binocular display with one or more projectors.

Figure 6:
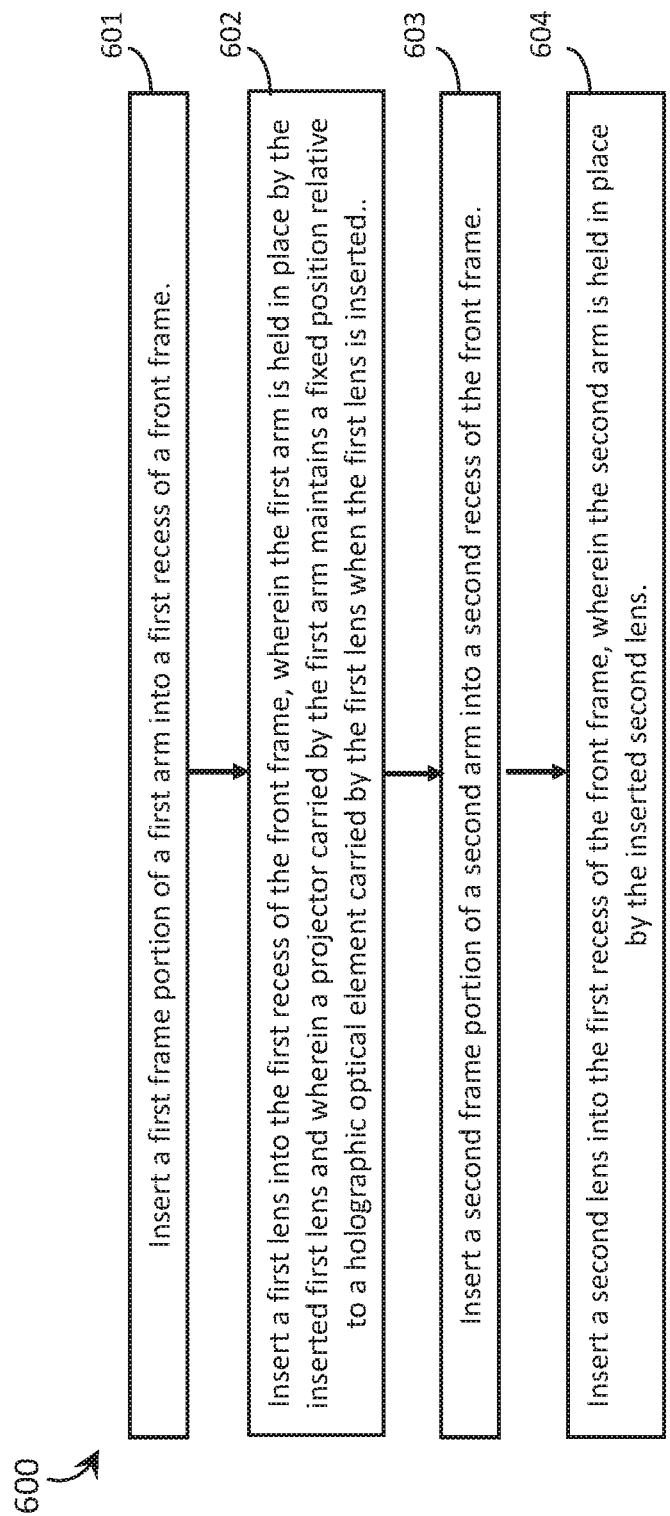
FIG. 6 is a flow diagram of a method of assembling a wearable heads-up display in accordance with the present systems devices and methods.

FIG. 6 is a flow diagram of a method of assembling a wearable heads-up display (WHUD) is accordance with the present systems, devices, and methods. The WHUD of FIG. 6 may be substantially similar to WHUD 500 of FIG. 5 and generally includes a support structure including a front eyeglasses frame having a first opening with a first recess and a second opening with a second recess, a first arm with a first temple portion and a first frame portion, and second arm with a second temple portion and a second frame portion, a first lens, a second lens, a projector carried by the first arm, a holographic optical element (HOE) carried by the first lens, and a power source carried by the support structure. Method 600 includes acts 601, 602, 603, and 604, thought those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 601, the first frame portion of the first arm is inserted into the first recess of the front eyeglasses frame. The first frame portion and the first recess of the front eyeglasses frame must be shaped such that the first frame portion can be inserted snugly into the first recess to prevent movement of the first arm relative to the front eyeglasses frame once the eyeglasses are fully assembled. The overall shape of the first arm, including the first temple portion and the first frame portion must be such that when the first frame portion is inserted into the front eyeglasses frame the first temple portion is approximately orthogonal to the front eyeglasses frame. That is, the first temple portion must be at an angle relative to the front eyeglasses frame that allows for the first arm to be worn over a first ear of a user while the front eyeglasses frame is positioned correctly on the face of the user.

At 602, the first lens is inserted into the first recess of the front eyeglasses frame, wherein the first frame portion of the first arm is in contact with the first lens and is held in place when the first lens is inserted, and wherein the projector carried by the first arm maintains a fixed position relative to the HOE when the first lens is inserted. The shape of the first frame portion and the front eyeglasses frame must allow for the first lens to be inserted into the first recess after the first frame portion has been inserted. That is, the first recess must be shaped to receive both the first frame portion and the first lens correctly. The first frame portion may be smooth and abut the first lens or the first frame portion may include a third recess aligned with the first recess into which the first lens is inserted when also inserted into the first recess. The insertion of the first lens may employ interference fit or a heat fitting the first lens into the first recess. The insertion of the first lens may also include other means to hold the first lens in place, such as glue or screws. The shape and position of the first arm, specifically the first frame portion, is such that, when the lens is inserted into the front eyeglasses frame, light from the projector is incident on the HOE in the correct location. This eliminates the need for further operations in the assembly/manufacturing process or post-assembly/manufacturing to properly align the optical components of the WHUD. Furthermore, the assembled first arm is in a fixed position relative to the first lens such that when external forces are applied, such as those which may occur when the WHUD is worn by the user, the light from the projector remains aligned with the HOE and the user is always able to see the display. As discussed above, any movement of the projector away from proper alignment with the HOE may result in light not being visible to the user or an image appearing distorted to the user.

At 603, the second frame portion is inserted into the second recess of the front eyeglasses frame. As with the first arm, the second frame portion and the second recess of the front eyeglasses frame must be shaped such that the second frame portion can be inserted snugly into the first recess to prevent movement of the second arm relative to the front eyeglasses frame once the eyeglasses are fully assembled. The overall shape of the second arm, including the second temple portion and the second frame portion must be such that when the second frame portion is inserted into the front eyeglasses frame the second temple portion is approximately orthogonal to the front eyeglasses frame. That is, the second temple portion must be at an angle relative to the front eyeglasses frame that allows for the second arm to be worn over a second ear of the user while the front eyeglasses frame is positioned correctly on the face of the user.

At 604, the second lens is inserted into the second recess of the front eyeglasses frame. The shape of the second frame portion and the front eyeglasses frame must allow for the second lens to be inserted into the second recess after the second frame portion has been inserted. That is, the second recess must be shaped to receive both the second frame portion and the second lens correctly. The second frame portion may be smooth and abut the second lens or the second frame portion may include a fourth recess aligned with the second recess into which the second lens is inserted when also inserted into the second recess. The insertion of the second lens may employ interference fit or heat fitting the second lens into the second recess. The insertion of the second lens may also include other means to hold the second lens in place, such as glue or screws. As the second arm and second lens do not carry display components it is not as important for these components to be assembled with precision or to function during use without moving, however, the second arm may carry a power source that is electrically coupled to the projector via components which pass through the front eyeglasses frame and it may be beneficial for the second arm to not move relative to the front eyeglasses frame. Other implementations may include a second display created by a second projector carried by the second arm and a second HOE carried by the second lens.

The various embodiments described herein generally reference and illustrate a single eye of a user (i.e., monocular applications), but a person of skill in the art will readily appreciate that the present systems, devices, and methods may be duplicated in a WHUD in order to provide scanned laser projection and scanned laser eye tracking for both eyes of the user (i.e., binocular applications).

The WHUDs described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. US 2015-0378161 A1, US Patent Application Publication No. 2016-0377866 A1 US, Non-Provisional patent application Ser. No. 15/046,234, U.S. Non-Provisional patent application Ser. No. 15/046,254, US Patent Application Publication No. US 2016-0238845 A1, U.S. Non-Provisional patent application Ser. No. 15/145,576, U.S. Non-Provisional patent application Ser. No. 15/145,609, U.S. Non-Provisional patent application Ser. No. 15/147,638, U.S. Non-Provisional patent application Ser. No. 15/145,583, U.S. Non-Provisional patent application Ser. No. 15/256,148, U.S. Non-Provisional patent application Ser. No. 15/167,458, U.S. Non-Provisional patent application Ser. No. 15/167,472, U.S. Non-Provisional patent application Ser. No. 15/167,484, U.S. Provisional Patent Application Ser. No. 62/271,135, U.S. Non-Provisional patent application Ser. No. 15/331,204, US Patent Application Publication No. US 2014-0198034 A1, US Patent Application Publication No. US 2014-0198035 A1, U.S. Non-Provisional patent application Ser. No. 15/282,535, U.S. Provisional Patent Application Ser. No. 62/268,892, U.S. Provisional Patent Application Ser. No. 62/322,128, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:
   a front eyeglasses frame, including: a first opening; a first recess which extends along at least a portion of a periphery of the first opening; a second opening and a second recess which extends along at least a portion of a periphery of the second opening;
   a first arm having a first frame portion and a first temple portion, at least one piece of the first frame portion which is dimensioned to be inserted into the first recess of the front eyeglasses frame and the first temple portion which extends rearwardly from the first frame portion with respect to the front eyeglasses frame when the at least one piece of the first frame portion is inserted into the first recess of the front eyeglasses frame; and a first lens, dimensioned to be inserted into the first recess, which holds the first arm in place in the front eyeglasses frame and prevents movement of the first frame portion relative to the front eyeglasses frame when the first lens is inserted into the first recess.

2. The apparatus of claim 1 wherein at least an anterior part of the first temple portion is in a fixed position relative to the front eyeglasses frame and the first lens when the first arm and first lens are inserted into the front eyeglasses frame.

3. The apparatus of claim 2 wherein the first arm has a hinge which allows for a posterior part of the first temple portion to be folded in towards the front eyeglasses frame while an anterior part of the first temple portion maintains a fixed position relative to the front eyeglasses frame.

4. The apparatus of claim 1 wherein the first arm carries at least one light source and wherein the at least one light source is positioned to direct light from the at least one light source toward an eye of a user when the apparatus is worn by the user.

5. The apparatus of claim 4, further comprising a power source which is carried by the first arm and is electrically coupled to the at least one light source.

6. The apparatus of claim 4, further comprising a power source which is carried by a second arm and is electrically coupled to the at least one light source.

7. The apparatus of claim 6 further comprising:
a second frame portion and a second temple portion of the second arm, at least one piece of the second frame portion which is dimensioned to be inserted into the second recess of the front eyeglasses frame and the second temple portion which extends rearwardly from the first frame portion with respect to the front eyeglasses frame when the at least one piece of the second frame portion is inserted into the second recess of the front eyeglasses frame;
a second lens dimensioned to be inserted into the second recess, wherein the second arm is held in place when the second lens is inserted into the second recess; and
wherein the second temple portion is at least partly hollow and the second arm has an aperture into the second temple portion which is covered by the front eyeglasses frame when the second arm is inserted into the second recess of the front eyeglasses frame, and wherein the apparatus further comprise at least one power source carried within the second temple portion, the at least one power source electrically coupled to the at least one light source.

8. The apparatus of claim 1 wherein the first temple portion is at least partly hollow and the first arm has an aperture into the first temple portion which is covered by the front eyeglasses frame when the first arm is inserted into the first recess of the front eyeglasses frame.

9. The apparatus of claim 8, further comprising at least one light source carried within the first arm, wherein light from the at least one light source is directed toward an eye of a user.

10. The apparatus of claim 9, further comprising at least one power source carried within the first temple portion, the at least one power source electrically coupled to the at least one light source.

11. A wearable heads-up display (WHUD) comprising:
a support structure including: a front eyeglasses frame, including: a first opening; a first recess which extends along at least a portion of a periphery of the first opening; a second opening and a second recess which extends along at least a portion of a periphery of the second opening;
a first arm having a first frame portion and a first temple portion, at least one piece of the first frame portion which is dimensioned to be inserted into the first recess of the front eyeglasses frame and the first temple portion which extends rearwardly from the first frame portion with respect to the front eyeglasses frame when the at least one piece of the first frame portion is inserted into the first recess of the front eyeglasses frame;
a first lens dimensioned to be inserted into the first recess and which holds the first arm in place in the front eyeglasses frame when the first lens is inserted into the first recess, wherein at least an anterior part of the first temple portion is prevented from moving from a fixed position relative to the front eyeglasses frame and the first lens when the first lens is inserted;
a projector carried by part of the first arm; and
a holographic optical element (HOE) carried by the first lens and positioned to receive light from the projector and to direct the received light towards the eye of a user when the wearable heads-up display is worn by the user, wherein when the first arm and first lens are inserted into the front eyeglasses frame the projector is in a fixed position relative to the HOE.

12. The WHUD of claim 11 further comprising a power source which is carried by the first arm and electrically coupled to the projector.

13. The WHUD of claim 11 further comprising:
a second arm having a second frame portion and a second temple portion, at least one piece of the second frame portion which is dimensioned to be inserted into the second recess of the front eyeglasses frame and the second temple portion which extends rearwardly from the first frame portion with respect to the front eyeglasses frame when the at least one piece of the second frame portion is inserted into the second recess of the front eyeglasses frame;
a second lens dimensioned to be inserted into the second recess, wherein the second arm is held in place when the second lens is inserted into the second recess, wherein at least an anterior part of the second arm is in a fixed position relative to the front eyeglasses frame and the second lens when the second lens is inserted; and
a power source which is carried by the second arm and electrically coupled to the projector.

14. The WHUD of claim 13 wherein at least one of the first temple portion and the second temple portion is at least partly hollow.

15. The WHUD of claim 14 wherein the first temple portion is at least partly hollow and the first arm has an aperture into the first temple portion which is covered by the front eyeglasses frame when the first arm is inserted into the front eyeglasses frame.

16. The WHUD of claim 14 wherein the second temple portion is at least partly hollow and the second arm has an aperture into the second temple portion which is covered by the front eyeglasses frame when the second arm is inserted into the front eyeglasses frame.

17. The WHUD of claim 14 wherein the first temple portion is at least partly hollow and the projector is at least partly carried within the first arm.

18. The WHUD of claim 14 wherein the first temple portion is at least partly hollow, and wherein the WHUD further comprises a power source which is electrically coupled to the projector and is at least partly carried within the first arm.

19. The WHUD of claim 14 wherein the second temple portion is at least partly hollow, and wherein the WHUD further comprises a power source which is electrically coupled to the projector and is at least partly carried within the second arm.

20. The WHUD of claim 11 wherein the first arm has a hinge which allows for a posterior part of the temple portion to be folded towards the front eyeglasses frame while an anterior part of the temple portion maintains a fixed position relative to the front eyeglasses frame.

21. A method of assembling eyeglasses that comprise a front eyeglasses frame having a first opening with a first recess which extends along at least a portion of a periphery of the first opening of the front eyeglasses frame, a first arm having a first temple portion and a first frame portion, the method comprising:

inserting the first frame portion of the first arm into the first recess of the front eyeglasses frame; and inserting the first lens into the first recess of the front eyeglasses frame to secure the first arm in place via the insertion of the first lens in the first recess of the front eyeglasses frame.

22. A method of assembling a wearable heads-up display (WHUD) that comprises: a front eyeglasses frame having a first opening with a first recess which extends along at least a portion of a periphery of the first opening of the front eyeglasses frame, a first arm having a first temple portion and a first frame portion, a first lens, a projector carried by the first arm, and a holographic optical element (HOE) carried by the first lens, the method comprising:

inserting the first frame portion of the first arm into the first recess of the front eyeglasses frame; and inserting the first lens into the first recess of the first opening of the front eyeglasses frame to hold the first arm in place such that the projector maintains a fixed position relative to the HOE when the first lens is inserted.

* * * * *

UNITED STATES PATENT AND TRADEMARK OFFICE
CERTIFICATE OF CORRECTION

PATENT NO. : 11,199,716 B2
APPLICATION NO. : 16/282960
DATED : December 14, 2021
INVENTOR(S) : Lloyd Frederick Holland, Joshua Moore and Stephen E. Orzel It is certified that error appears in the above-identified patent and that said Letters Patent is hereby corrected as shown below:

In the Claims

At Column 17 Line 22, insert --and a first lens,-- after "portion," and before "the"

Signed and Sealed this
Twenty-first Day of February, 2023

Katherine Kelly Vidal
*Director of the United States Patent and Trademark Office*